US012752901B1

(12) United States Patent
Dharmadhikari et al.

(10) Patent No.: US 12,752,901 B1
(45) Date of Patent: Oct. 6, 2026

(54) THERMAL MANAGEMENT SYSTEMS FOR MARINE VESSELS

(71) Applicant: Brunswick Corporation, Mettawa, IL (US)

(72) Inventors: Chetan Dharmadhikari, North Fond Du Lac, WI (US); Robert Dreyer, Appleton, WI (US); Josh Stoddard, South Daytona, FL (US)

(73) Assignee: Brunswick Corporation, Mettawa, IL (US)

(*) Notice: Subject to any disclaimer, the term of this patent is extended or adjusted under 35 U.S.C. 154(b) by 283 days.

(21) Appl. No.: 17/988,104

(22) Filed: Nov. 16, 2022

(51) Int. Cl.
*B63H 21/38* (2006.01)
*B60L 58/26* (2019.01)

(52) U.S. Cl.
CPC ............ *B63H 21/383* (2013.01); *B60L 58/26* (2019.02); *B60L 2240/545* (2013.01)

(58) Field of Classification Search
CPC .......... B63H 21/38; B63H 21/383; B63J 2/04; B63J 2/12; B63J 2002/125
See application file for complete search history.

(56) References Cited

U.S. PATENT DOCUMENTS 3,721,104 A 3/1973 Adler
4,226,606 A 10/1980 Yaeger et al.
4,617,472 A 10/1986 Slavik
5,004,042 A 4/1991 McMorries et al.
5,599,217 A 2/1997 Ferrante
5,746,270 A 5/1998 Schroeder et al.
5,848,536 A 12/1998 Dodge
6,273,771 B1 8/2001 Buckley et al.
6,525,431 B1 2/2003 Clucas
6,612,504 B2 9/2003 Sendzik
(Continued)

FOREIGN PATENT DOCUMENTS

CN 102407931 B 11/2013
CN 205930240 U 2/2017
(Continued)

OTHER PUBLICATIONS

Search Report in corresponding Application No. EP24171732.1, dated Oct. 9, 2024, 8 pages.
(Continued)

*Primary Examiner* — Jianying C Atkisson
*Assistant Examiner* — Khaled Ahmed Ali Al Samiri
(74) *Attorney, Agent, or Firm* — Andrus Intellectual Property Law, LLP

(57) ABSTRACT

A thermal management system for a marine vessel. The thermal management system includes an open loop circuit and a pump that pumps water from the body of water in which the marine vessel is operating, through the open loop circuit, and back to the body of water. Another pump pumps a first heat transfer fluid through a first closed loop circuit for cooling or heating a first component. A heat exchanger is configured to exchange heat between the water and the first heat transfer fluid. Another pump pumps a second heat transfer fluid through a second closed loop circuit for cooling or heating a second component. A valve has valve positions for selecting whether heat is exchanged between the second heat transfer fluid and the water from the body of water for heating or cooling the second component.

13 Claims, 9 Drawing Sheets

(56) References Cited

U.S. PATENT DOCUMENTS

| | | | |
|---|---|---|---|
| 7,066,777 B2 | 6/2006 | Maseltee | |
| 7,089,955 B1 | 8/2006 | Komro, Sr. | |
| 7,094,118 B1 | 8/2006 | Phillips et al. | |
| 7,114,469 B1 | 10/2006 | Taylor | |
| 7,150,664 B1 | 12/2006 | Uppgard et al. | |
| 7,156,709 B1 | 1/2007 | Staerzl et al. | |
| 7,172,831 B2 | 2/2007 | Kumar et al. | |
| 7,255,616 B1 | 8/2007 | Caldwell | |
| 7,264,520 B1 | 9/2007 | Taylor et al. | |
| 7,284,710 B2 | 10/2007 | Rixen | |
| 7,416,456 B1 | 8/2008 | Gonring et al. | |
| 7,467,595 B1 | 12/2008 | Lanyi et al. | |
| 7,503,819 B1 | 3/2009 | Jaeger et al. | |
| 7,569,954 B2 | 8/2009 | Tölle et al. | |
| 7,789,176 B2 | 9/2010 | Zhou | |
| 7,975,637 B1 | 7/2011 | Nida | |
| 8,011,982 B1 | 9/2011 | Baier | |
| 8,043,132 B1 | 10/2011 | Wyant | |
| 8,137,146 B2 | 3/2012 | Cohen | |
| 8,298,025 B2 | 10/2012 | Eichinger | |
| 8,336,319 B2 | 12/2012 | Johnston et al. | |
| 8,403,234 B2 | 3/2013 | Wolter | |
| 8,500,501 B1 | 8/2013 | Taylor | |
| 8,535,104 B1 | 9/2013 | Nida | |
| 8,763,566 B1 | 7/2014 | Taylor et al. | |
| 8,864,538 B1 * | 10/2014 | Arbuckle | B63H 21/383<br>440/88 P |
| 8,944,865 B1 | 2/2015 | Krabacher et al. | |
| 9,234,450 B2 | 1/2016 | England et al. | |
| 9,248,898 B1 | 2/2016 | Kirchhoff et al. | |
| 9,359,057 B1 | 6/2016 | Andrasko et al. | |
| 9,403,588 B1 | 8/2016 | George et al. | |
| 9,446,828 B1 | 9/2016 | Groeschel et al. | |
| 9,446,830 B2 | 9/2016 | Hartmeyer et al. | |
| 9,505,307 B2 | 11/2016 | Champagne et al. | |
| 9,680,190 B1 | 6/2017 | Xia | |
| 9,758,010 B2 | 9/2017 | Johnston | |
| 9,802,459 B2 | 10/2017 | Kamps et al. | |
| 9,802,687 B2 | 10/2017 | Davis et al. | |
| 9,815,539 B1 | 11/2017 | Provost | |
| 9,975,619 B1 | 5/2018 | Gonring | |
| 9,994,296 B1 | 6/2018 | Balogh et al. | |
| 10,047,661 B1 | 8/2018 | Torgerud | |
| 10,151,539 B2 | 12/2018 | Kamps et al. | |
| 10,184,684 B2 | 1/2019 | Kurelowech | |
| 10,336,429 B1 | 7/2019 | Amerling et al. | |
| 10,408,548 B2 | 9/2019 | Bell et al. | |
| 10,495,025 B2 | 12/2019 | Bell et al. | |
| 10,594,510 B1 | 3/2020 | Arbuckle et al. | |
| 10,889,205 B2 * | 1/2021 | Hettrich | B60L 1/003 |
| 10,890,098 B1 | 1/2021 | Anderson | |
| 10,967,702 B2 | 4/2021 | Mancini | |
| 11,072,408 B1 | 7/2021 | Kurzynski | |
| 11,214,114 B2 | 1/2022 | Smith | |
| 11,286,027 B1 | 3/2022 | Dharmadhikari | |
| 11,293,335 B1 | 4/2022 | Radavich | |
| 11,352,937 B1 | 6/2022 | Dreyer | |
| 11,358,434 B2 | 6/2022 | Porras | |
| 2002/0079376 A1 | 6/2002 | Enander | |
| 2003/0226904 A1 | 12/2003 | Haklander | |
| 2006/0130888 A1 | 6/2006 | Yamaguchi et al. | |
| 2007/0147809 A1 | 6/2007 | Rixen | |
| 2010/0279153 A1 | 11/2010 | Payne | |
| 2012/0152186 A1 | 6/2012 | Sujan | |
| 2012/0180997 A1 | 7/2012 | Johnston | |
| 2016/0059949 A1 | 3/2016 | Rebele et al. | |
| 2016/0107505 A1 * | 4/2016 | Johnston | B60H 1/00278<br>165/202 |
| 2018/0178615 A1 | 6/2018 | Xia | |
| 2018/0354339 A1 | 12/2018 | Smith et al. | |
| 2018/0372334 A1 | 12/2018 | Walker | |
| 2019/0176572 A1 | 6/2019 | Kim | |
| 2019/0383563 A1 | 12/2019 | He et al. | |
| 2020/0255112 A1 | 8/2020 | Doremus et al. | |
| 2020/0370463 A1 | 11/2020 | Saruwatari | |
| 2021/0197692 A1 | 7/2021 | Hettrich | |
| 2022/0097484 A1 | 3/2022 | Rixens | |
| 2022/0111700 A1 | 4/2022 | Henderson | |
| 2022/0115719 A1 | 4/2022 | King | |
| 2023/0242230 A1 | 8/2023 | Nakagawa | |

FOREIGN PATENT DOCUMENTS

| | | | |
|---|---|---|---|
| CN | 108482064 | A | 9/2018 |
| CN | 209441180 | U | 9/2019 |
| CN | 110588277 | A | 12/2019 |
| CN | 112678139 | A | 4/2021 |
| CN | 112682157 | | 4/2021 |
| CN | 213743657 | U | 7/2021 |
| CN | 114523816 | A | 5/2022 |
| DE | 102009056027 | | 1/2014 |
| DE | 102021131215 | A1 | 6/2022 |
| EP | 2044370 | | 4/2009 |
| EP | 2907739 | A1 | 8/2015 |
| EP | 3454401 | | 5/2021 |
| GB | 2388184 | A | 11/2003 |
| JP | 2006103537 | A | 4/2006 |
| JP | 2014239607 | A | 12/2014 |
| KR | 20170021142 | A | 2/2017 |
| KR | 20210015197 | A | 2/2021 |
| KR | 102542738 | B1 | 6/2023 |
| WO | 2010102606 | | 9/2010 |
| WO | 2011005775 | | 1/2011 |
| WO | 2013029808 | | 3/2013 |
| WO | 2013124610 | A2 | 8/2013 |
| WO | 2021055758 | A1 | 3/2021 |

OTHER PUBLICATIONS

Search Report in corresponding Application No. GB2405641.8, dated Sep. 16, 2024, 5 pages.
Whale RV Catalog, pp. 8-9, https://www.delzer.com/navico/whale-rv-catalog/8/, accessed Apr. 11, 2023.
Dharmadhikari et al., "Marine Drives And Marine Vessels Having Cooling Systems", U.S. Appl. No. 17/978,758, filed Nov. 1, 2022 (drawings, specification, and claims only).
Dharmadhikari et al., "Thermal Management Systems And Methods For Thermally Managing Components For Marine Vessels", U.S. Appl. No. 17/900,470, filed Aug. 31, 2022 (drawings, specification, and claims only).
Kelly, "Thermal Management Systems For Marine Vessels", U.S. Appl. No. 17/977,570, filed Oct. 31, 2022 (drawings, specification, and claims only).
Denso, Heat Pump Air-Conditioning System, https://www.denso.com/global/en/business/products-and-services/mobility/pick-up/hpacs/, accessed Apr. 13, 2023.
Naik et al., "Marine Propulsion System And Method For Wake Control", U.S. Appl. No. 17/903,938, filed Sep. 6, 2022 (drawings, specification, and claims only).
Kuuma 11 Gallon Marine Water-Heater 120V Front Heat Exchanger Front/Bak Mount, Camco Marine, https://www.camcomarine.com/products/11-gal-water-heater-120v-front-heat-exch-fr-back-mount, accessed Nov. 10, 2023.
Witte, "Cooling System For A Marine Vessel", U.S. Appl. No. 18/053,513, filed Nov. 8, 2022 (drawings, specification, and claims only).

* cited by examiner

THERMAL MANAGEMENT SYSTEMS FOR MARINE VESSELS

FIELD

The present disclosure generally relates to thermal management systems for marine vessels.

BACKGROUND

The following U.S. Patents provide background information and are incorporated by reference in entirety.

U.S. Pat. No. 7,975,637 discloses a method and apparatus for controlling the temperature of batteries in a hybrid marine vessel utilizing a compartment to store the batteries and various conduits to conduct air to and from that compartment. A heat exchanger can draw air from the compartment and cool the air for use in the cabin of the marine vessel. The air from the cabin can be directed into the compartment to provide a flow of air that carries heat away from the batteries in the compartment and toward the heat exchanger.

U.S. Pat. No. 8,864,538 discloses systems and methods for cooling a marine propulsion system on a marine vessel. A lift pump pumps raw cooling water from a body of water in which the marine vessel is situated. The lift pump pumps the raw cooling water through an open cooling circuit from an upstream inlet for receiving the raw cooling water to a downstream outlet for discharging the cooling water back to the body of water. A control circuit controls operation of the lift pump. At least one sensing device indicates whether the lift pump is connected to the body of water. The sensing device is in communication with the control circuit. The control circuit prevents operation of the lift pump when the sensing device indicates that the lift pump is not connected to the body of water.

U.S. Pat. No. 9,403,588 discloses systems for cooling a marine engine operated in a body of water. The systems can include an open loop cooling circuit for cooling the marine engine. The open loop cooling circuit is configured to convey cooling water from the body of water to the marine engine so that heat is exchanged between the cooling water and the marine engine. A pump is configured to pump the cooling water from upstream to downstream through the open loop cooling circuit. A heat exchanger is configured to cause an exchange of heat between the cooling water located upstream of the marine engine and the cooling water located downstream of the marine engine to thereby warm the cooling water located upstream of the marine engine, prior to cooling the marine engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a thermal management system for a marine vessel. The thermal management system includes an open loop circuit and a pump that pumps water from the body of water in which the marine vessel is operating, through the open loop circuit, and back to the body of water. Another pump pumps a first heat transfer fluid through a first closed loop circuit for cooling or heating a first component. A heat exchanger is configured to exchange heat between the water and the first heat transfer fluid. Another pump pumps a second heat transfer fluid through a second closed loop circuit for cooling or heating a second component. A valve has valve positions for selecting whether heat is exchanged between the second heat transfer fluid and the water from the body of water for heating or cooling the second component.

Another embodiment of the present disclosure generally relates another thermal management system for a marine vessel. The thermal management system includes an open loop circuit and a pump that pumps water from the body of water in which the marine vessel is operating, through the open loop circuit, and back to the body of water. Another pump pumps a first heat transfer fluid through a first closed loop circuit for cooling or heating a first component. A heat exchanger is configured to exchange heat between the water and the first heat transfer fluid. Another pump pumps a second heat transfer fluid through a second closed loop circuit for cooling or heating a second component. A mixing chamber is configured to mix the first heat exchange fluid and the second heat exchanger fluid together when conveyed to the mixing chamber. A valve has valve positions for selecting whether the first heat exchange fluid and the second heat exchange fluid are both conveyed to the mixing chamber to mix for cooling or heating the first component.

Another embodiment of the present disclosure generally relates to another thermal management system for a marine vessel. The thermal management system includes an open loop circuit and a pump that pumps water from the body of water in which the marine vessel is operating, through the open loop circuit, and back to the body of water. Another pump pumps a first heat transfer fluid through a first closed loop circuit for cooling or heating a first component. Another pump pumps a second heat transfer fluid through a second closed loop circuit for cooling or heating a second component. A heat exchanger is configured to exchange heat between the water and the first heat transfer fluid. A valve has valve positions for selecting whether heat is exchanged between the second heat transfer fluid and the water, and between the second heat transfer fluid and the first heat transfer fluid, for cooling or heating the first component.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

The present disclosure generally relates to thermal management systems for marine vessels. As discussed further below, these thermal management systems include separate circuits through which heat transfer fluids are pumped for cooling or heating components with each respective circuit. The heat transfer fluid of one circuit can be selectively used to provide additional cooling or heating for the components of the other circuit as needed. It should be recognized that while the present disclosure generally provided examples of thermal management system 10 used in conjunction with marine vessels, other uses and context are also contemplated, including recreational vehicles (RVs) and other vehicles having components requiring cooling and/or heating.

Figure 1:
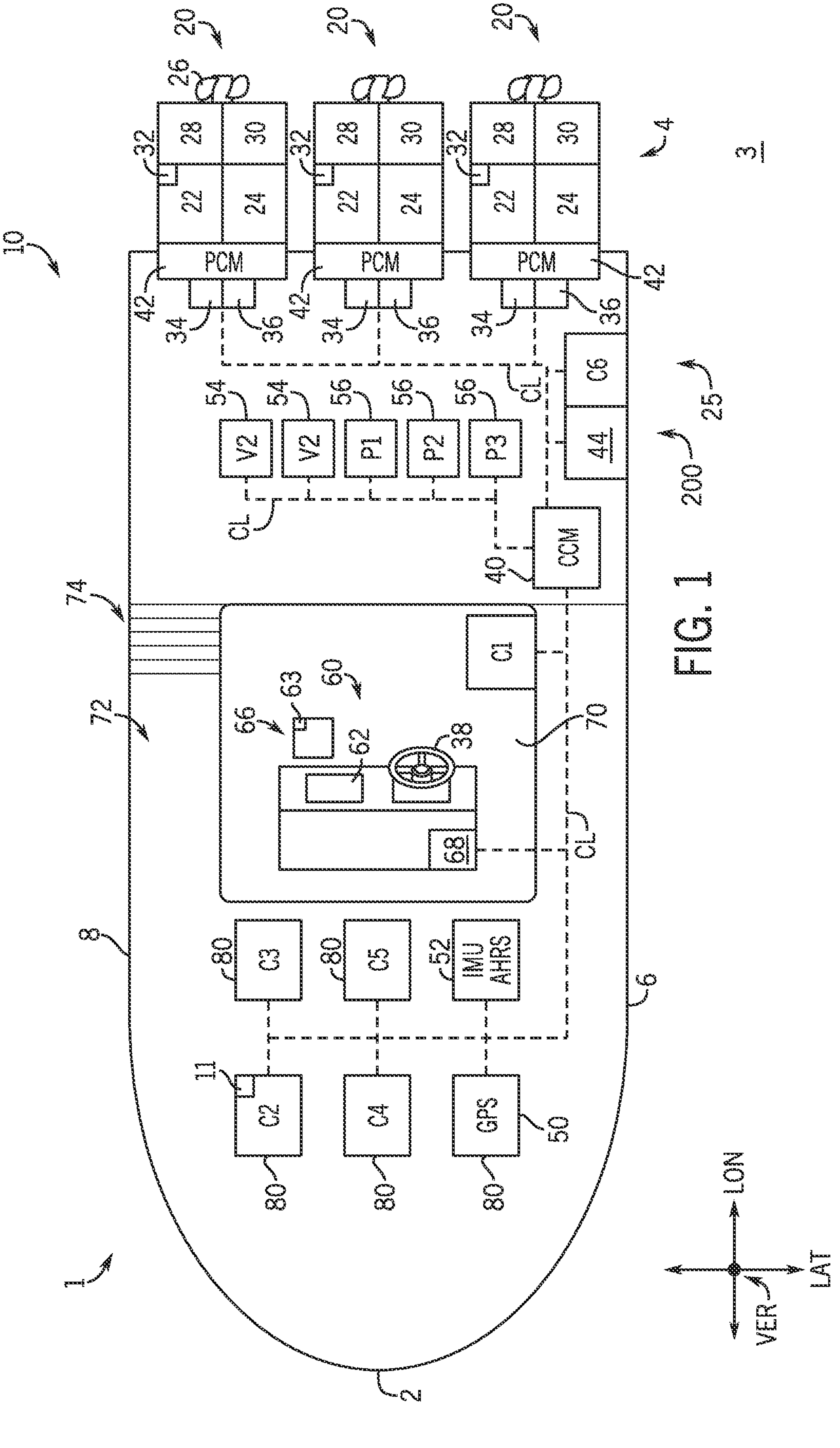
FIG. 1 is a top view of a marine vessel incorporating a thermal management system according to the present disclosure.

FIG. 1 shows a thermal management system 10 for a marine vessel 1 according to the present disclosure. The marine vessel 1 extends between a bow 2 and a stern 4 along a longitudinal axis LON and between a port side 6 and starboard side 8 along a latitudinal axis LAT perpendicular to the longitudinal direction LON (each also being perpendicular to the vertical axis VER). The marine vessel 1 is propelled through a body of water 3 by marine propulsion devices 20, which while shown as outboard motors could also be inboard motors, stern drives, pod drives, and/or jet drives. Each marine propulsion device 20 includes a powerhead 22. The powerheads 22 may be internal combustion engines (e.g., gasoline or diesel engines), electric motors, and/or hybrids thereof. A propeller 26 is coupled in torque-transmitting relationship with each powerhead 22 to generate propulsion in the water. The rotational engagement between the powerhead 22 and the propeller 26 is provided through a multi-speed transmission 28 and gearset 30 in a manner known in the art. The marine propulsion devices 20 further include powerhead speed sensors 32 that measure a speed of the respective powerheads 22 in a manner known in the art.

Steering actuators 34 are operable to steer the marine propulsion device 20 in accordance with commands from a steering input device such as a steering wheel 38. The steering actuators 34 may be hydraulically, pneumatically, and/or electromechanically operated such as those discussed in U.S. Pat. Nos. 7,150,664; 7,255,616; and 7,467,595, which are incorporated by reference herein. Similarly, trim actuators 36 are operable to adjust a trim angle for each of the marine propulsion devices 20 in a manner known in the art. The trim actuators 36 may be hydraulically, pneumatically, and/or electromechanically operated such as those discussed in U.S. Pat. Nos. 6,583,728; 7,156,709; 7,416,456; and 9,359,057, which are incorporated by reference herein.

With continued reference to FIG. 1, a central control module 40 (or CCM) is provided in signal communication with propulsion control modules 42 of the marine propulsion devices 20, as well as with other devices discussed herein. Although FIG. 1 shows one central control module 40, the present disclosure contemplates configurations in which multiple central control modules work together, serially and/or in parallel (e.g., providing a central control module for each marine propulsion devices 20). Likewise, it should be recognized that the lines CL shown to represent both communication and power connections are merely examples.

A power system 25 provides electric power various devices within the marine vessel 1, including the powerheads 22 in the case of electric or hybrid powerheads. By way of example, the power system 25 may include batteries and/or other power storage devices, chargers, inverters (e.g., DC-AC inverters, AC-DC inverters), converters (e.g., DC-DC converters), and power distribution systems. The devices within the power system 25 may be provided as local power systems 24 positioned with the marine propulsion devices 20, a central power system 44 positioned in the marine vessel 1, or a combination thereof.

Another device powered by the power system 25 is a global positioning system (GPS) 50 that provides location and speed of the marine vessel 1 to the central control module 40. The power system 25 also powers an inertial measurement unit (IMU) or an attitude and heading reference system (AHRS) (collectively shown as the IMU/AHRS 52). An IMU has a solid state, rate gyro electronic compass that indicates the vessel heading and solid-state accelerometers and angular rate sensors that sense the vessel's attitude and rate of turn. Further devices powered by the power system 25 include valves 54 and pumps 56 within the thermal management system 10, which provide heating and cooling for devices as discussed below. The valves 54 are not limited to being opened or closed and the pumps 56 are not limited to operating or not operating; either maybe variable to throttle flow rates, pressures, and the like.

With continued reference to FIG. 1, the marine vessel 1 includes a helm 60 having a number of operator input devices for controlling various functions of the thermal management system 10 and the marine vessel 1 more generally. The operator input devices at the helm 60 include a multi-functional display device 62 including a user interface, such as an interactive, touch-capable display screen, a keypad, a display screen and keypad combination, and/or any other interfaces known in the art. By way of example, the display device 62 may be part of a VesselView® onboard management system by Mercury Marine Corporation of Fond du Lac, Wisconsin. The operator input devices further include one or more steering devices, such as the steering wheel 38 and/or a joystick, configured to facilitate user input for steering the marine vessel 1 (e.g., via the central control module 40, the propulsion control modules 42, and/or a helm controller 68 in a manner known in the art). A throttle lever 66 is also provided as an operator input device for providing thrust commands to the central control module 40. Additional information relating to input devices and related control is provided in U.S. Pat. Nos. 9,248,898; 9,975,619; 9,994,296; and 10,594,510; which are incorporated by reference herein.

The helm 60 of the marine vessel 1 is positioned in a cockpit 70, which in FIG. 1 is positioned above a cabin 72 and accessible via stairs 74. Various devices are positioned within the cockpit 70 and within the cabin 72 that require heating and/or cooling depending on usage, which may also be referenced as components 80. Some of the components 80 of FIG. 1 are separately identified as components C1-C5 for further discussion. Component C1 is an HVAC system for the cockpit 70, which requires heating when controlled to heat the cockpit 70 and cooling when controlled to cool the cockpit 70. Components C2-C5 are used in conjunction with the cabin 72. Component C2 is an HVAC system for the cabin 72 that, like the HVAC system for the cockpit 70, requires heating when controlled to heat the cabin 72 and cooling when controlled to cool the cabin 72. Component C3 is a refrigerator and thus only requires cooling (also referred to as being a heat "source"). Component C4 is a freezer and thus, like component C3, requires only cooling. Component C5 is a water heater, thereby requiring only heating (also referred to as being a heat "sink"). The components 80 to be heated or cooled by the thermal management system 10 may include other heat sources, heat sinks, or combinations thereof associated with the marine propulsion devices 20 or marine vessel 1. By way of example, these other components 80 may include powerheads 22, multi-speed transmissions 28, or portions of the power system 25.

Figure 2:
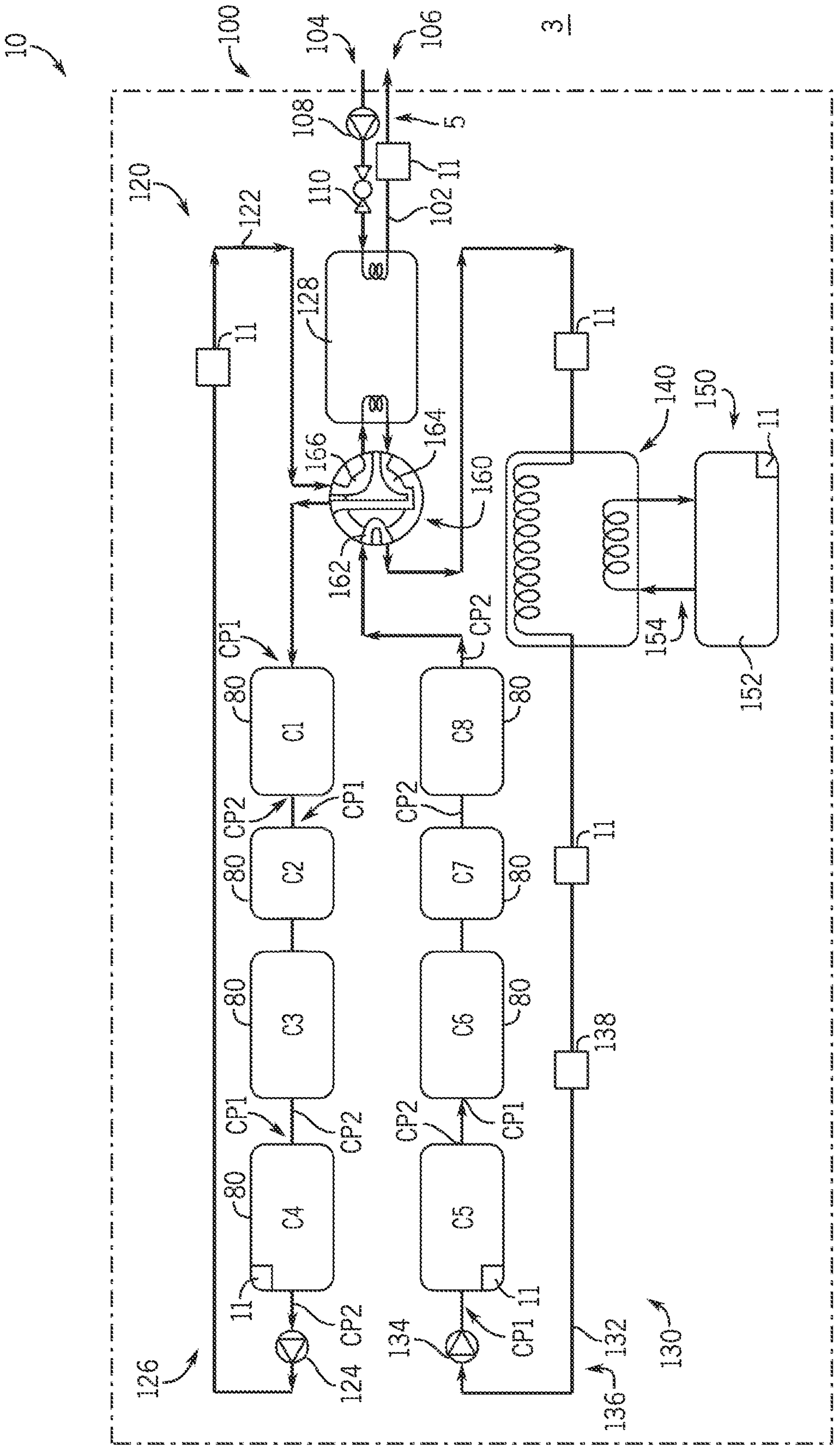
FIG. 2 is schematic view of one embodiment of a thermal management system according to the present disclosure with a valve in a first valve position.
Figure 3:
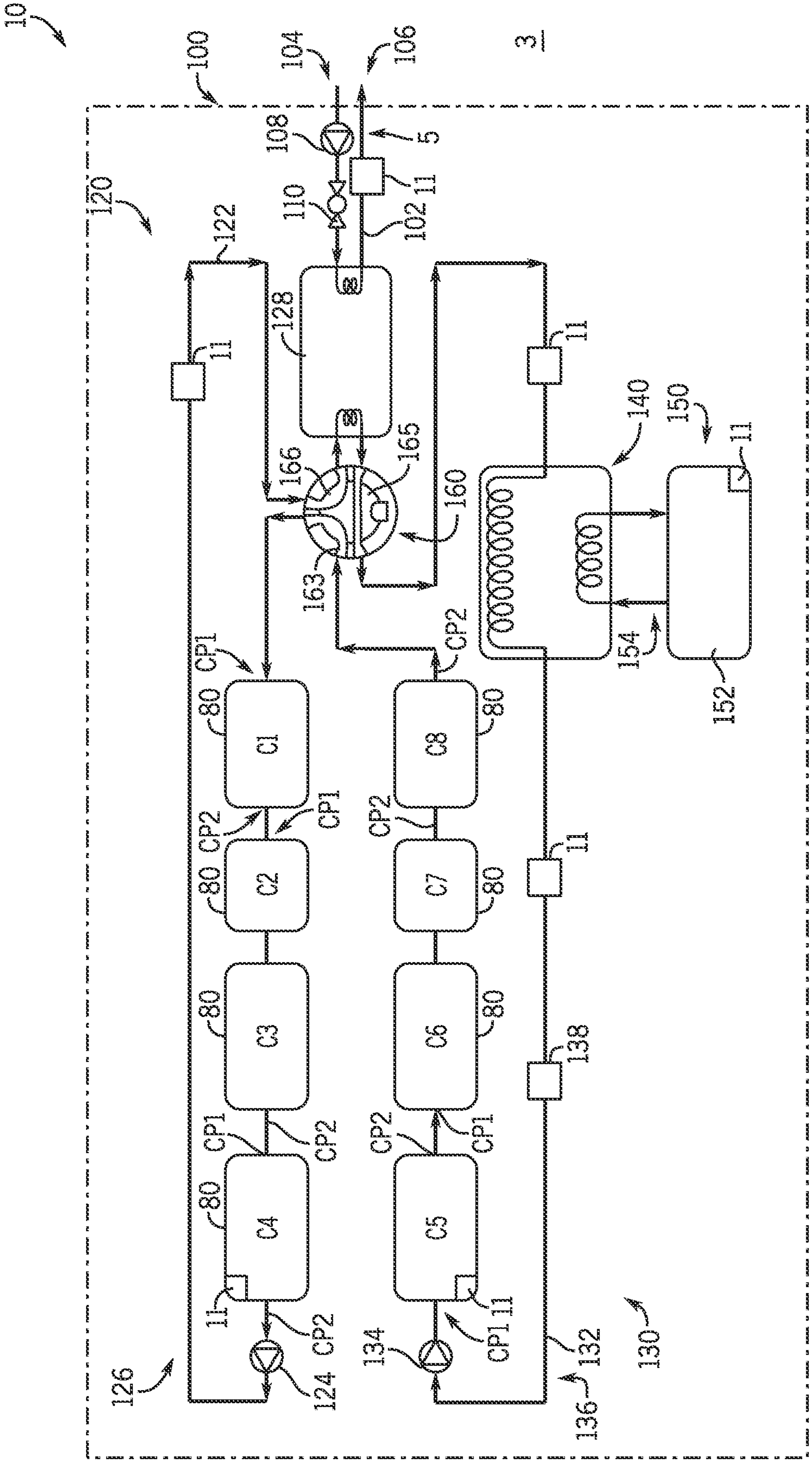
FIG. 3 is schematic view of the thermal management system of FIG. 2 with the valve in a second valve position.

FIGS. 2 and 3 show one thermal management system 10 for sharing heating and cooling across the components 80 of a marine vessel according to the present disclosure. The thermal management system 10 includes an open loop circuit 100 that extends via conduits 102 between an inlet 104 and an outlet 106. The inlet 104 is positioned so as to draw in water 5 from the body of water 3 in which the marine vessel is operated. The outlet 106 is positioned to return the water from the open loop circuit 100 back to the body of water 3. A pump 108 is fluidly connected within the open loop circuit 100 and pumps the water 5 from the body of water 3 into the inlet 104, through the open loop circuit 100, and back to the body of water 3 via the outlet 106. The pump 108 may also be operated in verse to clear any debris within the open loop circuit 100. A valve 110 is provided within the open loop circuit 100 and is positionable to select whether between the water 5 is pumped via the pump 108 to a first heat exchanger 128, which is discussed further below.

By way of example, the conduits 102 may be combinations of hoses, pipes, through-holes, and passages through components (such as a heat exchanger as discussed below). The inlet 104 and/or the outlet 106 may be formed in a gearcase of a marine propulsion device 20 or provided as through-hole in a hull of the marine vessel in a conventional manner.

The thermal management system 10 further includes a first closed loop circuit 120 formed by conduits 122. A pump 124 is fluidly connected within the first closed loop circuit 120 and pumps a heat transfer fluid 126 therethrough. The heat transfer fluid 126 may be water, another liquid such as a refrigerant used in air conditioning systems, or a water-ethylene-glycol (WEG) mixture or dielectric oil. The conduits 122 may be similar to the conduits 102 of the open loop circuit 100.

With continue reference to FIG. 2, the open loop circuit 100 and the first closed loop circuit 120 each extend through the first heat exchanger 128. The first heat exchanger 128 is configured to exchange heat between the water 5 in the open loop circuit 100 and the heat transfer fluid 126 in the first closed loop circuit 120. It should be recognized that, via the first heat exchanger 128, the water 5 in the open loop circuit 100 heats the heat transfer fluid 126 when warmer than the heat transfer fluid 126, and conversely cools the heat transfer fluid 126 when cooler than the heat transfer fluid 126. Additional information regarding heat exchangers and cooling circuits is provided in U.S. Pat. Nos. 5,004,042; 5,746,270; 6,748,906; and 7,094,118, which are incorporated by reference in their entireties.

The heat transfer fluid 126 is circulated through the first closed loop circuit 120 to heat and cool a set of components 80 as needed. The components 80 discussed herein may include cold plates, water jackets or other manifolds in a manner known in the art that provide heat exchange between the component 80 and the heat transfer fluid 126 flowing therethrough. In addition to facilitating heat transfer, the use of cold plates, water jackets, manifolds, and/or the like also isolate and protect other portions of the component from exposure to the heat transfer fluid 126 (e.g., electronics, oil passages or reservoirs, exhaust passages). Similar to the discussion above with respect to the first heat exchanger 128, a given component 80 is cooled when the heat transfer fluid 126 provided thereto is cooler than that component 80 and is warmed when the heat transfer fluid 126 is warmer than that component 80. For simplicity, the present disclosure refers to providing the heat transfer fluid to the components or the heat transfer fluid flowing through the components irrespective of how heat is exchanged between the components and the heat transfer fluid.

The set of components 80 within the first closed loop circuit 120 are also referred to individually as components C6-C9 for further discussion. It should be noted that these components C6-C9 may overlap with components 80 or other devices discussed above. By way of example, the sixth component C6 may be an inverter, the seventh component C7 may be one or more motors (e.g., powerheads 22 of an electric or hybrid marine propulsion device 20 as shown in FIG. 1), the eighth component C8 may be one or more powertrain components (e.g., a multi-speed transmission 28 or gearset 30 as shown in FIG. 1), and the ninth component C9 may be a power distribution unit (e.g., part of the power local power systems 24 integrated with the marine propulsion devices 20, the central power system 44 positioned in the marine vessel 1, or a combination thereof).

The components C6-C9 are fluidly connected to each other in series via conduits 122 between first component ports CP1 and second component ports CP2 thereof. The pump 124 causes the heat transfer fluid 126 to flow through the first closed loop circuit 120 in a clockwise direction. The sequence that the components C6-C9 are connected within the first closed loop circuit 120 may be selected based on the required or optimal operating temperatures of these components. For example, the sixth component C6 may require lower operating temperatures than the ninth component C9. Positioning the sixth component C6 upstream of the ninth component C9 therefore advantageously provides cooler temperatures of the heat transfer fluid 126 to the sixth component C6 after passing through the first heat exchanger 128.

It should be recognized that the direction in which the heat transfer fluid 126 flows through the first closed loop circuit 120 may also be variable, such as reversing the direction when the components 80 require heating versus cooling. The components 80 may also be fluidly connected in alternate configurations, including in parallel to one or more other components 80. Additional information regarding control systems for controlling the operation of various pumps and valves within the thermal management system 10 is provided below.

The thermal management system 10 of FIG. 2 further includes a second closed loop circuit 130 formed by conduits 132. A pump 134 is fluidly connected within the second closed loop circuit 130 and pumps another heat transfer fluid 136 through the second closed loop circuit 130. The heat transfer fluid 136 may be water, a liquid chemically the same as the heat transfer fluid 126 of the first closed loop circuit 120, or another liquid such as a refrigerant used in air conditioning systems or a water-ethylene-glycol (WEG) mix or dielectric oil. The conduits 132 may be similar to the conduits 102 or the conduits 122 discussed above.

With continued reference to FIG. 2, the heat transfer fluid 136 is circulated through the second closed loop circuit 130 to heat and cool a set of components 80 therein as needed, shown here as components C10-C13. By way of example, the tenth component C10 may be a battery, the eleventh component C11 may be a battery charger configured to charge the battery, the twelfth component C12 may be a heater, and the thirteenth component C13 may be a DC-DC converter. It should be recognized that these components and others may be positioned within the marine propulsion devices 20, the marine vessel 1, or a combination of both. Each of the components C10-C13 are connected via first and second component ports CP1, CP2 as shown and described above. Some of the components 80 in the second closed loop circuit 130, as within other circuits, may coincide with components discussed above and shown in FIG. 1. By way of example, and with reference to FIG. 1, components C10-C13 may be part of the power local power systems 24 integrated with the marine propulsion devices 20, the central power system 44 positioned in the marine vessel 1, or a combination thereof.

The second closed loop circuit 130 is configured such that the heat transfer fluid 136 flows therethrough in a clockwise direction, which may be fixed or variable as discussed above with relation to the first closed loop circuit 120. The components C10-C13 are in some cases connected in series based on the heat tolerance of each component individually. In other words, components 80 with lower required or optimal operating temperatures are connected upstream of others having relatively higher required or optimal operating temperatures (e.g., the battery being upstream of the battery charger). This provides the maximum heat exchange between the heat transfer fluid 136 and the components 80 having the greatest need for heat exchange. It should be recognized that the arrangement of components 80 in this manner also applies to other circuits and thermal management systems contemplated by the present disclosure.

With continued reference to FIG. 2, the second closed loop circuit 130 extends through a second heat exchanger 140. A closed loop refrigerant circuit 150 also extends through the second heat exchanger 140. A refrigerant system 152 cools a refrigerant 154 (e.g., WEG) that through the closed loop refrigerant circuit 150 in a manner known in the art. The second heat exchanger 140 is configured such that heat is exchanged between the heat transfer fluid 136 in the second closed loop circuit 130 and the refrigerant 154 from the closed loop refrigerant circuit 150 in a similar manner as the first heat exchanger 128 discussed above. In certain configurations, the refrigerant system 152 is controlled to cool the refrigerant 154 as needed. By way of example, the refrigeration system 152 may be controlled to operate based on measurements from temperatures sensors 11 measuring temperatures within the conduits of the closed loop refrigerant circuit 150, the second closed loop circuit 130, or other circuits, within different components 80, or elsewhere in the thermal management system 10.

The thermal management system 10 of FIG. 2 further includes a valve 160 having different positions for selecting fluidly connecting the first closed loop circuit 120 and the second closed loop circuit 130. The valve 160 has pathways 162, 164, 166 that change the flow of the heat transfer fluid 126 and the heat transfer fluid 136 through the valve 160 and thus through the first closed loop circuit 120 and the second closed loop circuit 130. In a first valve position as shown in FIG. 2, the valve 160 is closed so as to fluidly isolate the second closed loop circuit 130 from the first closed loop circuit 120. Specifically, the heat transfer fluid 126 within the first closed loop circuit 120 flows from the first heat exchanger 128 through the pathway 164 in the valve 160 to the components C6-C9, then back to the first heat exchanger 128 via the pathway 166 in the valve 160. In this manner, the components 80 in the first closed loop circuit 120 are heated or cooled via heat exchange between the heat transfer fluid 126 and the water 5 from the body of water 3 inside the first heat exchanger 128. The components 80 in the second closed loop circuit 130 are cooled via heat exchange between the heat transfer fluid 136 and the refrigerant 154 inside the second heat exchanger 140, as discussed above.

In this manner, the heat transfer fluid 136 in the second closed loop circuit 130 may be kept at a lower temperature than the heat transfer fluid 126 in the first closed loop circuit 120 by virtue of the refrigeration system 152 providing more cooling than the water 5 from the body of water 3. It should be recognized that the present disclosure also contemplates configurations in which the heat transfer fluid 136 may be heated or controllable to provide heating or cooling as needed.

FIG. 3 shows the same valve 160 in a second valve position that fluidly connects the first closed loop circuit 120 and the second closed loop circuit 130 in series. The heat transfer fluid 126 in the first closed loop circuit 120 and the heat transfer fluid 136 in the second closed loop circuit 130 are now able to mix together. Moreover, the heat transfer fluids 126, 136 now each pass through the components 80 in both the first closed loop circuit 120 and the second closed loop circuit 130, as well as through both the first heat exchanger 128 and the second heat exchanger 140. In particular, the heat transfer fluids 126, 136 within the first closed loop circuit 120 flow through the pathway 166 in the valve 160 to the first heat exchanger 128, then through another passageway 165 in the valve 160 to the second closed loop circuit 130 and the second heat exchanger 140 and the components C10-C13 in the second closed loop circuit 130, then through another passageway 163 in the valve 160 to the first closed loop circuit 120 and the components C6-C9 (now in opposite sequence to that of FIG. 2) before returning to the first heat exchanger 128 again.

The configuration of FIG. 3 provides that the components 80 within the second closed loop circuit 130 may also be cooled (or heated) via heat exchange between the heat transfer fluids 126, 136 and the water 5 inside the first heat exchanger 128. This may be in addition to or as an alternative to heat exchange inside the second heat exchanger 140 with the refrigerant 154 from the refrigeration system 152.

This same configuration of FIG. 3 may also provide for additional cooling of the components 80 (C6-C9) within the first closed loop circuit 120 above and beyond what is possible via heat exchanger with the water 5 within the first heat exchanger 128. In this case, the components 80 in the first closed loop circuit 120 receive additional cooling because the heat transfer fluids 126, 136 have now exchanged heat with the refrigerant 154 inside the second heat exchanger 140 in addition to, or as an alternative to, exchanging heat with the water 5 from the body of water 3 within the first heat exchanger 128.

The present inventors have recognized that the thermal management system 10 of FIGS. 2 and 3 advantageously permit for the valve 160 to be positioned in the first valve position (FIG. 2) when the temperature of the body of water 3 is relatively warm (e.g., above a threshold temperature that is too warm for cooling components C10-C13). By way of example, the threshold may be 80° F., 85° F., 90° F., 95° F., or 100° F., which may compared to measurements from one or more temperature sensors 11. In this case, the body of water 3 may still be suitable for cooling the components C6-C9 in the first closed loop circuit 120, but the refrigerant system 152 may be operated to cool the more sensitive components C10-C13 within the second closed loop circuit 130 via heat exchange inside the second heat exchanger 140. It should be recognized that the threshold may also be a range of thresholds (e.g., corresponding to different valve positions between fully open and fully closed).

In contrast, when the temperature of the body of water 3 is determined to be cooler than the predetermined threshold, the valve 160 may be positioned in the second valve position (FIG. 3) such that the body of water 3 is also used for cooling the components C10-C13 in the second closed loop circuit 130. This control method reduces the demand on compressors and other components within the refrigeration system 152, thereby reducing power consumption and extending the life of the refrigeration system 152.

Additional savings may be also be realized with respect to the pumps 108, 124, 134 within the thermal management system 10, which may be operated via a combination of onboard power (e.g., battery) and rotation via the powertrain. Thus, power can be saved by disabling battery-powered pumps when the powertrain is operating (i.e., relying instead of powertrain driven pumps to circulate the heat transfer fluids), and enabling these battery-powered pumps when the powertrain is not operating and/or need additional circulation.

The present inventors have further recognized that the second valve position of the valve 160 in FIG. 3 is advantageous for operating when the components 80 in the first closed loop circuit 120 require more cooling than can be provided by the body of water 3, such as in very warm water. In this case, the pump 108 in the open loop circuit 100 can be turned off such that heat transfer fluids 126, 136 are not subjected to the warm body of water 3.

Additionally, the components 80 in both the first closed loop circuit 120 and the second closed loop circuit 130 can share heating (or cooling) by selectively operating the among of cooling provided by the refrigeration system 152. For example, the heat transfer fluid 126 passing through the powertrain components (e.g., C8) is warmed quickly, which can be advantageously used to warm other elements such as a battery (e.g., C10) that require longer times to heat. The pump 108 in the open loop circuit 100 may again be turned off so as to increase the temperatures of the heat transfer fluids 126, 136 more quickly. Once these additional components are also heated to desired operating temperatures, the valve 160 may be controlled to change valve positions to maintain the temperatures of the first closed loop circuit 120 and the second closed loop circuit 130 independently.

The present inventors have further recognized that the thermal management system 10 of FIGS. 2-3 permit the first closed loop circuit 120 and the second closed loop circuit 130 to share elements beyond those providing heat exchange. Specifically, positioning the valve 160 in the second valve position (FIG. 3) advantageously allows a single reservoir 138 to be used to accommodate for expansion of fluids in both the first closed loop circuit 120 and the second closed loop circuit 130. This may be particularly useful for operating in extreme conditions. Additionally, using a single reservoir 138 simplifies the operator's burden to monitor and maintain proper fluid levels across a system having multiple closed loop circuits (i.e., the operator need only fill one reservoir).

Figure 4:
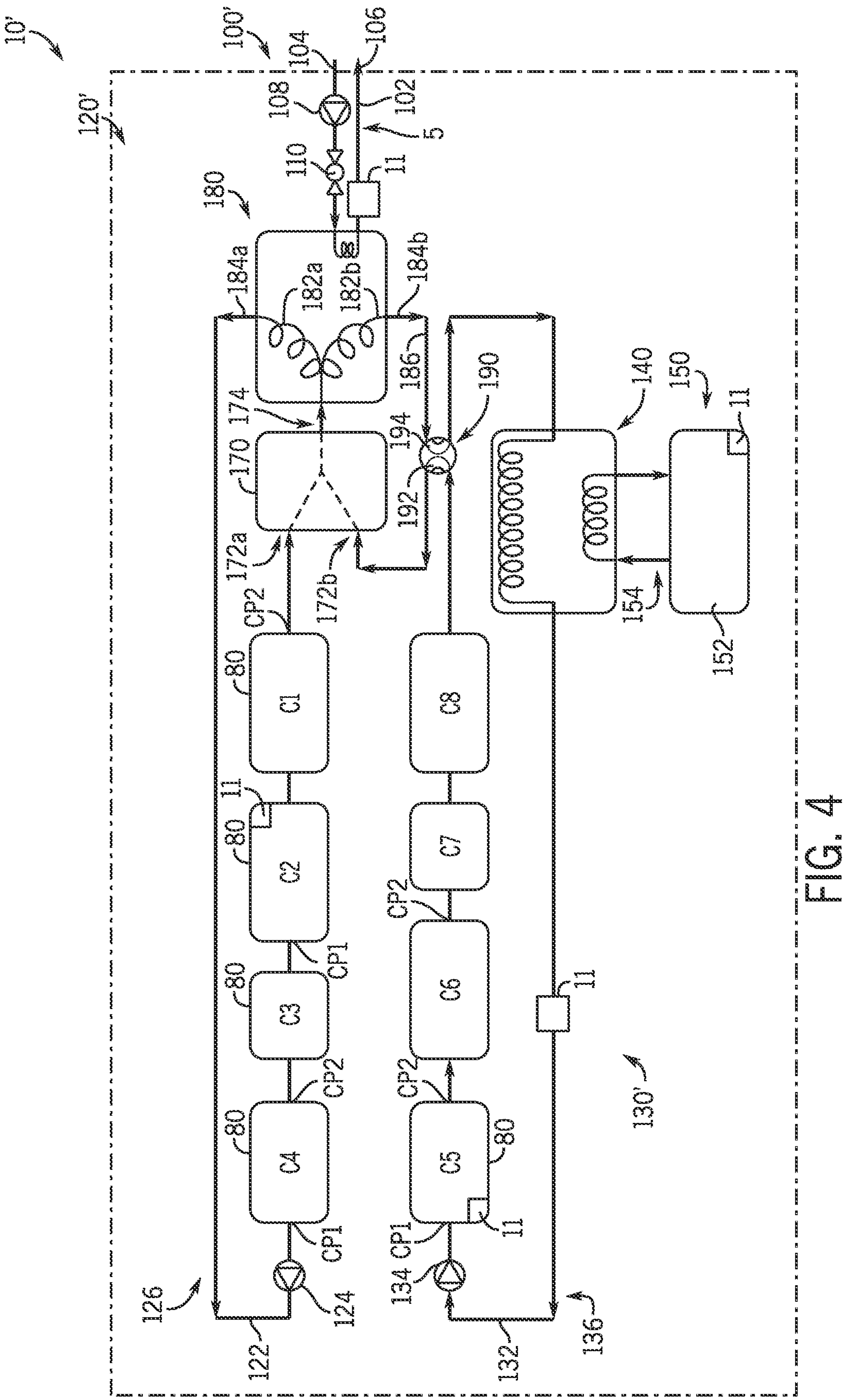
FIG. 4 is schematic view of another embodiment of a thermal management system according to the present disclosure.

FIG. 4 shows another thermal management system 10' for sharing heating and cooling across the components 80 of a marine vessel according to the present disclosure. For simplicity, the thermal management system 10' is shown having an open loop circuit 100', a first closed loop circuit 120', and a second closed loop circuit 130' similar to the open loop circuit 100, the first closed loop circuit 120, and the second closed loop circuit 130 from the thermal management system 10 of FIGS. 2 and 3. Likewise, the same components 80, pumps 108, 124, 134, heat transfer fluids 126, 136, and other elements from the thermal management system 10 are also shown for the thermal management system 10'. Other arrangements for the open loop circuit 100', the first closed loop circuit 120', and the second closed loop circuit 130' are also contemplated by the present disclosure.

The thermal management system 10' includes a mixing chamber 170 having two inlets 172*a*, 172*b* and an outlet 174. The two inlets 172*a*, 172*b* are fluidly connected to the conduits 122, 132 of the first closed loop circuit 120' and the second closed loop circuit 130', respectively. To the extent heat transfer fluids 126, 136 are received from the first closed loop circuit 120' and the second closed loop circuit 130', respectively (discussed further below), these heat transfer fluids 126, 136 mix inside the mixing chamber 170 and exit via the outlet 174. In this manner, the temperatures of the heat transfer fluids 126, 136 upon exiting the outlet 174 of the mixing chamber 170 have a generally common temperature (e.g., an average of the temperatures received at the inlets 172*a*, 172*b*). The present disclosure also contemplates other configurations for mixing the heat transfer fluids 126, 136, including the use of Y-joints connecting the first closed loop circuit 120 and the second closed loop circuit 130. Additional discussion regarding controlling the flow of these heat transfer fluids 126, 136 to the mixing chamber 170 is provided below.

With continued reference to FIG. 4, the thermal management system 10' further includes a first heat exchanger 180 configured such that the heat transfer fluids 126, 136 passing therethrough are divided and flow separately through pathways 182*a*, 182*b* to outlets 184*a*, 184*b*. The outlets 184*a*, 184*b* fluidly connected to the first closed loop circuit 120' and the second closed loop circuit 130', respectively. In this manner, the first closed loop circuit 120' and the second closed loop circuit 130' each effectively flow though the first heat exchanger 180; however, the heat transfer fluids 126, 136 enter the first heat exchanger 180 mixed together and exit separated again. The present disclosure contemplates alternative configurations for providing this converging and re-diverting function, including dividing the heat transfer fluids 126, 136 downstream rather than inside the first heat exchanger 180. The present inventors have recognized that in certain configurations, having the pathways 182*a*, 182*b* diverge inside the first heat exchanger 180 provides for greater heat exchange with the open loop circuit 100' inside the first heat exchanger 180.

A valve 190 is provided within the second closed loop circuit 130', whereby positioning the valve 190 varies whether the second closed loop circuit 130' is fluidly connected to the mixing chamber 170 and the first heat exchanger 180. The valve 190 has pathways 192, 194 and is positionable in two valve positions. In one valve position, as shown in FIG. 4, the pathways 192, 194 provide that the heat transfer fluid 136 from the second closed loop circuit 130' passes through the pathway 192 to the mixing chamber 170 where it mixes with the heat transfer fluid 126 from the first closed loop circuit 120'. The combined heat transfer fluids 126, 136 then exit the outlet 174 of the mixing chamber 170 to exchange heat along the pathways 182*a*, 182*b* within the first heat exchanger 180 before exiting the outlets 184*a*, 184*b* thereof, respectively. Part of the mixed heat transfer fluid 126, 136 exits the outlet 184*a*, which is fluidly connected within the first closed loop circuit 120' as discussed above. The other part of the mixed heat transfer fluid 126, 136 exits the outlet 184*b* of the first heat exchanger 180 to flow through the pathway 194 in the valve 190, then to the second heat exchanger 140 within the second closed loop circuit 130'.

In a second valve position of the valve 190 (whereby the pathways 192, 194 are rotated 90 degrees from that shown in FIG. 4), the valve 190 fluidly isolates the second closed loop circuit 130' from the mixing chamber 170 and the first heat exchanger 180. In this case, the heat transfer fluid 136 flows, unmixed and separate from the heat transfer fluid 126 of the first closed loop circuit 120', through the pathway 192 of the valve 190 within the second closed loop circuit 130'. The unmixed heat transfer fluid 126 exit both the outlet 184*a* and the outlet 184*b* of the first heat exchanger 180. The portion of the heat transfer fluid 126 exiting the outlet 184*a* is circulated though the first closed loop circuit 120 as discussed above. The portion of the heat transfer fluid 126 exiting the outlet 184*b* returns, via a bypass conduit 186, to the mixing chamber 170 via the pathway 194 of the valve 190.

The volume exiting the outlets 182, 184 need not be equal to each other, controllable by valves or other mechanisms known in the art. The present disclosure also contemplates alternate pathways for the valve 190, including in the second valve position in which the second closed loop circuit 130' is fluidly isolated from the mixing chamber 170 and the first heat exchanger 180. By way of example, the second valve position of the valve 190 may block the flow of heat transfer fluid 126 from the outlet 184*b* of the first heat exchanger 180 rather than it passing through the valve 190 to return to the mixing chamber 170.

The thermal management system 10' of FIG. 4 offers advantages over systems presently known in the art. The integration of the mixing chamber 170 allows warmer heat transfer fluid (e.g., heat transfer fluid 126, cooled only via the body of water 3) and cooler heat transfer fluid (e.g., heat transfer fluid 136, cooled via a refrigerant 154 in the second heat exchanger 140) to be selectively mixed together for further flexibility, efficiency, and improved performance. Similar to that discussed above for the thermal management system 10 of FIGS. 2 and 3, the thermal management system 10' of FIG. 4 may be controlled to fluidly isolate the first closed loop circuit 120' and the second closed loop circuit 130' when the marine vessel is operated in a warm body of water 3 (e.g., by positioning the valve 190 in the second valve position as discussed above). In contrast, the valve 190 may be positioned in the first valve position (FIG. 4) when operating in a cooler environment such that the heat transfer fluids 126, 136 mix, reducing the demand on the refrigeration system 152 by permitting some cooling in the second closed loop circuit 130' to be provided via the body of water 3. Likewise, the valve 190 may be positioned in the first valve position to warm a battery or another component 80 by increasing the temperature of the heat transfer fluid 126, 136 provided thereto from cooling other components, as also discussed above in conjunction with the thermal management system 10 of FIGS. 2 and 3.

The thermal management system 10' of FIG. 4 provides further advantages over those known in the art, and in certain cases over the serial connection of the first closed loop circuit 120 and the second closed loop circuit 130 discussed above for FIGS. 2 and 3. In particular, the thermal management system 10' provides for the heat transfer fluids 126, 136 to flow through the first closed loop circuit 120 and the second closed loop circuit 130 essentially in parallel, rather than in series. The present inventors have recognized that by flowing in parallel, the flow rates of the heat transfer fluids 126, 136 through the first heat exchanger 180 are equal to sum of flow rates through the first closed loop circuit 120' and the second closed loop circuit 130'. The flow rate of the heat transfer fluids 126, 136 through the first heat exchanger 180 is thus increased, increasing the efficiency of heat transfer therein without needing to increase the flow rate and decrease the pressure through the components 80 in the first closed loop circuit 120' and the second closed loop circuit 130'. Additionally, this configuration provides that each pump has a lower pressure rise, thereby saving energy by not having to work as hard.

Figure 5:
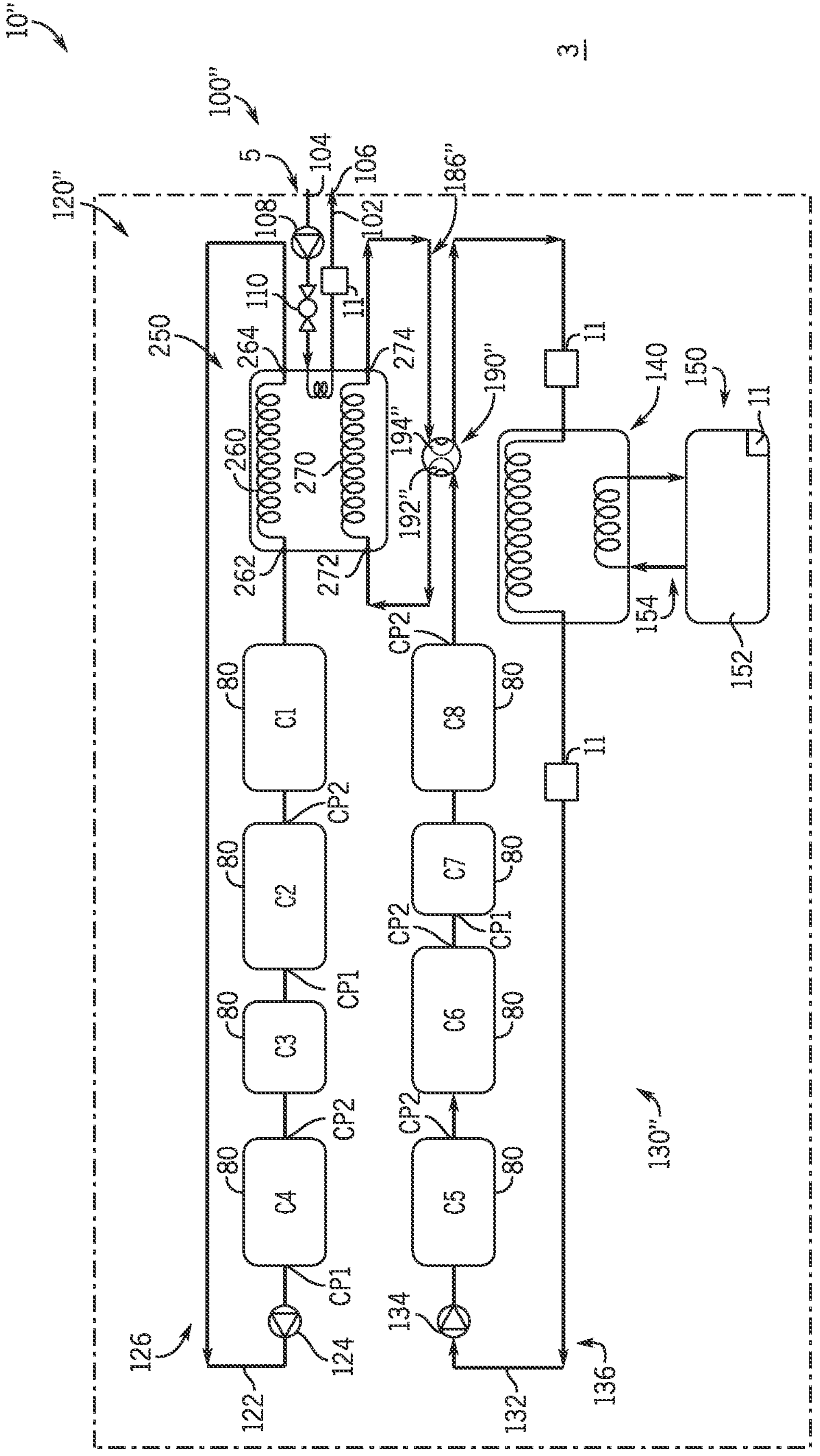
FIG. 5 is schematic view of another embodiment of a thermal management system according to the present disclosure.

FIG. 5 shows another thermal management system 10" for sharing heating and cooling across the components 80 of a marine vessel according to the present disclosure. For simplicity, the thermal management system 10" is shown having an open loop circuit 100", a first closed loop circuit 120", and a second closed loop circuit 130" similar to the open loop circuit 100, the first closed loop circuit 120, and the second closed loop circuit 130 from the thermal management system 10 of FIGS. 2 and 3. The same components 80, pumps 108, 124, 134, heat transfer fluids 126, 136, and other elements from the thermal management system 10 are shown for the thermal management system 10" of FIG. 5 for simplicity. However, the present disclosure contemplates other arrangements for the open loop circuit 100", the first closed loop circuit 120", and the second closed loop circuit 130" than that shown.

The thermal management system 10" includes a heat exchanger 250 configured to be fluidly connected within the open loop circuit 100", the first closed loop circuit 120", and the second closed loop circuit 130". The heat exchanger 250 includes a first pathway 260 that extends between an inlet 262 and an outlet 264 for fluidly connecting the heat exchanger 250 within the first closed loop circuit 120". The heat exchanger 250 also includes a second pathway 270 that extends between an inlet 272 and an outlet 274 for fluidly connecting the heat exchanger 250 within the second closed loop circuit 130". The heat exchanger 250 further includes a pathway for conveying the water 5 from the open loop circuit 100" in a conventional manner, as with the heat exchangers discussed above (e.g., first heat exchanger 128).

The heat exchanger 250 exchanges heat between the water 5 in the open loop circuit 100", the heat transfer fluid 126 in the first closed loop circuit 120", and, selectively, the heat transfer fluid 136 in the second closed loop circuit 130". The water 5, the heat transfer fluid 126, and the heat transfer fluid 136 do not mix. Instead, the open loop circuit 100", the first closed loop circuit 120", and the second closed loop circuit 130" remain fluidly isolated.

A valve 190" is provided within the second closed loop circuit 130" and selectively varies whether the second closed loop circuit 130" is fluidly connected to convey the heat transfer fluid 136 to the heat exchanger 250. The valve 190" has pathways 192", 194" and is positionable in two valve positions. In one valve position, as shown in FIG. 5, the pathways 192", 194" provide that the heat transfer fluid 136 from the second closed loop circuit 130" passes through the pathway 192" to the heat exchanger 250 to exchange heat with the water 5 and the heat transfer fluid 126 also passing through the heat exchanger 250.

In a second valve position of the valve 190", whereby the pathways 192", 194" are rotated 90 degrees from that shown in FIG. 5, the valve 190" fluidly isolates the second closed loop circuit 130' from the heat exchanger 250. In this valve position, the heat transfer fluid 136 flows through the pathway 192" of the valve 190" within the second closed loop circuit 130". Any fluid within the pathway 270 in the heat exchanger 250 remains fluidly isolated from the second closed loop circuit 130". The inlet 272 and the outlet 274 of the pathway 270 are connected together via a bypass conduit 186" and the pathway 192" in the valve 190".

The thermal management system 10" of FIG. 5 offers advantages over systems presently known in the art. One advantage is that the heat transfer fluids 126, 136 need not be chemically the same as each other since they remain fluidly isolated in all valve positions. By way of example, this provides that separate coolants may be used to cool the powertrain component (e.g., C8 in the first closed loop circuit 120") versus the battery (e.g., component C10 in the second closed loop circuit 130"). Additionally, the thermal management system 10" may control the valve 190", other valves (e.g., valve 110), the pumps 108, 124, 134, and the refrigeration system 152 to select between heating and cooling for a component as needed, and whether to use the body of water 3 as a source or sink based on its temperature. When the body of water 3 is determined to be cold, the thermal management system 10" may use the water 5 from the body of water 3 for cooling a battery (e.g., C10) or other component 80. The same battery may instead share the heat from another component 80, such as a powertrain component (e.g., C8) when the battery requires heating.

In this case, the powertrain or other component may by cooled from this heat exchange with the battery alone or be further supplemented via exchange between the heat transfer fluid 126 in the first closed loop circuit 120" and the water 5 in the heat exchanger 250, depending on the among of cooling needed for the powertrain component, the amount of heating required for the battery, and/or the temperature of the body of water 3. For example, the pump 108 of the open loop circuit 100" may initial be turned off to maximize the transfer of heat from the powertrain component (e.g., C8) in the first closed loop circuit 120" and the battery (e.g., C10) in the second closed loop circuit 130" within the heat exchanger 250. It should be recognized that the needs of these components 80 are not static and therefore the thermal management system 10" may vary the control of these elements as needed over time.

Additional combinations of the valves and pumps can be used to manage transient operations. By way of example, during acceleration for a marine propulsion device having an electric or hybrid powerhead, when both motor torque and current demand from the battery are high, the valves and pumps may be operated to deliver coolant to refrigerant section for the battery. This will help cool battery in anticipation of heating, thereby preventing transient temperature overshoots. Similarly, during charging operation, the valves and pumps may be operated based on a charging current to provide anticipated cooling demand.

Figure 6:
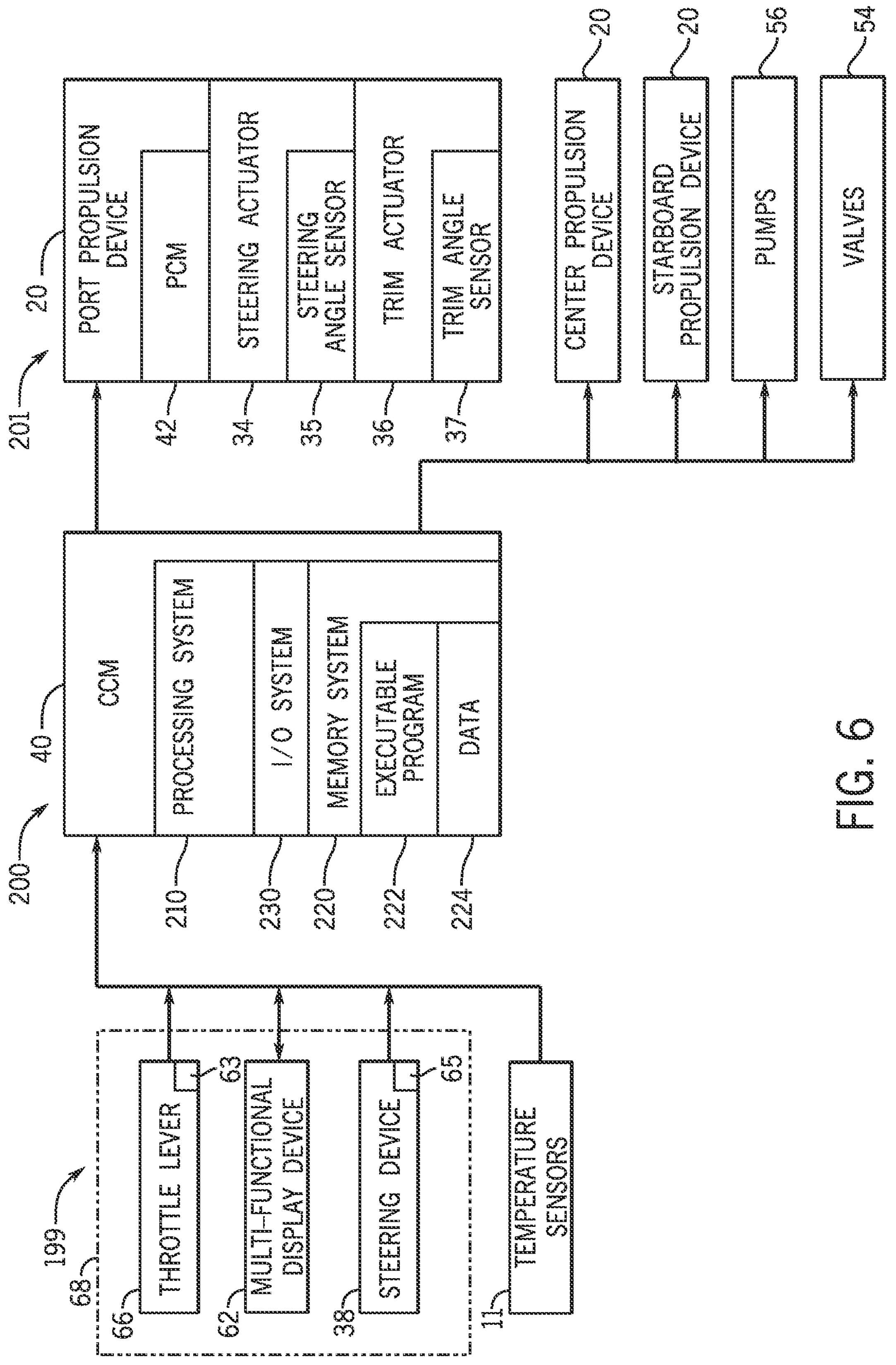
FIG. 6 is a schematic view of a control system for controlling a thermal management system according to the present disclosure.

Additional information is now provided regarding the control of the thermal management systems 10 (as well as thermal management systems 10' and 10") of the present disclosure. It should be recognized that while prime indicators were used above for certain reference numbers, any discussion of a reference number throughout this disclosure may apply to that number regardless of prime indication unless otherwise noted (i.e., teachings relating to a thermal management system 10 also apply to 10' and 10" above, valves 190 apply to valves 190', and the like). FIG. 6 shows one example of a control system 200 for controlling the valves 190, pumps 108, 124, 134, and other elements of the thermal management system 10 according to the present disclosure.

The control system 200 of FIG. 6 includes subsystems therein, such as one or more central control modules 40, one or more propulsion control modules 42, the helm controller 68, and/or other controllers discussed above and shown in FIG. 1. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 210, which may be implemented as a single microprocessor or other circuitry or be distributed across multiple processing devices or sub-systems that cooperate to execute the executable program 222 from the memory system 220. Non-limiting examples of the processing system include general purpose central processing units, application specific processors, and logic devices.

Each central control module 40 further includes a memory system 220, which may comprise any storage media readable by the processing system 210 and capable of storing the executable program 222 and/or data 224. The memory system 220 may be implemented as a single storage device or be distributed across multiple storage devices or sub-systems that cooperate to store computer readable instructions, data structures, program modules, or other data. The memory system 220 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 230 provides communication between the control system 200 and peripheral devices, such as input devices 199 and output devices 201, which are discussed further below. The IO system 230 communicates via wires and/or wirelessly via input devices 199 and/or output devices 201, or with other elements of the control system 200. In practice, the processing system 210 loads and executes an executable program 222 from the memory system 220, accesses data 224 stored within the memory system 220, and directs the thermal management system 10 to operate as described in further detail below.

A person of ordinary skill in the art will recognize that these subsystems within the control system 200 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. One or more central control module 40 may together constitute a control system 200 and may be located anywhere on the marine vessel 1.

A person of ordinary skill in the art will understand in light of the disclosure that the control system 200 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 200 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 200 is capable of receiving information and/or controlling one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are capable of communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various different types of wireless and/or wired data communication systems.

As will be discussed further below, the control system 200 communicates with input devices 199 from various components such as steering devices, for example via sensors 63, 65 that detect the positions of the throttle lever 66, and the steering device 38, respectively. The control system 200 also communicates with other input devices 199, such as the multi-functional display device 62, the GPS 50, the IMU/AHRS 52, and temperature sensors 11 as discussed above.

The control system 200 also communicates with output devices 101 such as propulsion control modules 42, steering actuators 34 (and steering angle sensors 35 associated therewith), and trim actuators 36 (and trim angle sensors 37 associated therewith), as well as the pumps 56 (e.g., pumps 108, 124, 134) and valves 54 (e.g., 110, 190) described above. It will be recognized that the arrows shown are merely exemplary and that communication may flow in multiple directions. For example, the multi-functional display device 62 may serve as both an input device 199 for the operator to provide commands, and an output device 101 to display information transmitted from the central control module 40.

In certain configurations, the control system 200 automatically changes the valve positions of the valve 190 based on the usage of the components 80, and/or based on temperature measurements provided from the temperature sensors 11. As discussed above, this may include controlling the valve 190" to be in the valve position shown in FIG. 5 when the body of water 3 can be used for cooling to supplement or replace operation of the refrigeration system 152. In particular, the control system 200 may determine that the refrigeration system 152 is not required when temperature sensors 11 indicate that the body of water 3 and/or the temperature of components 80 within the second closed loop circuit 130" is/are below a threshold temperature. This preserves energy for the marine vessel 1 while also extending the life of the refrigeration system 152. In another example, the valve 190" may be rotated 90 degrees from that shown in FIG. 5 when components 80 in the second closed loop circuit 130" require maximum cooling by preventing heat exchange with the heat transfer fluid 126 of the first closed loop circuit 120" and the water 5 within the heat exchanger 250.

Figure 7:
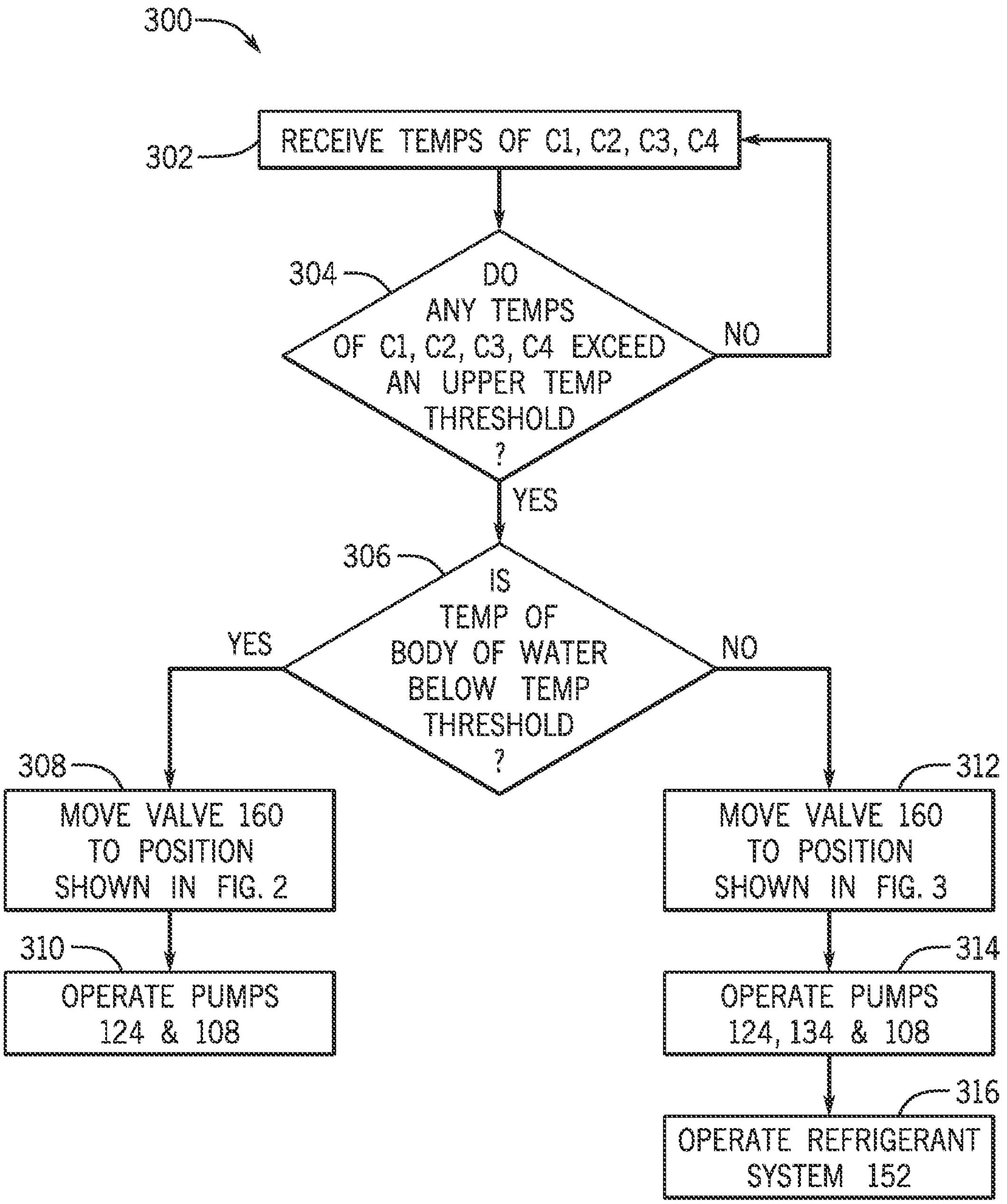
FIG. 7 is a flow chart depicting one method according to the present disclosure for controlling a thermal management system such as shown in FIG. 2.
Figure 8:
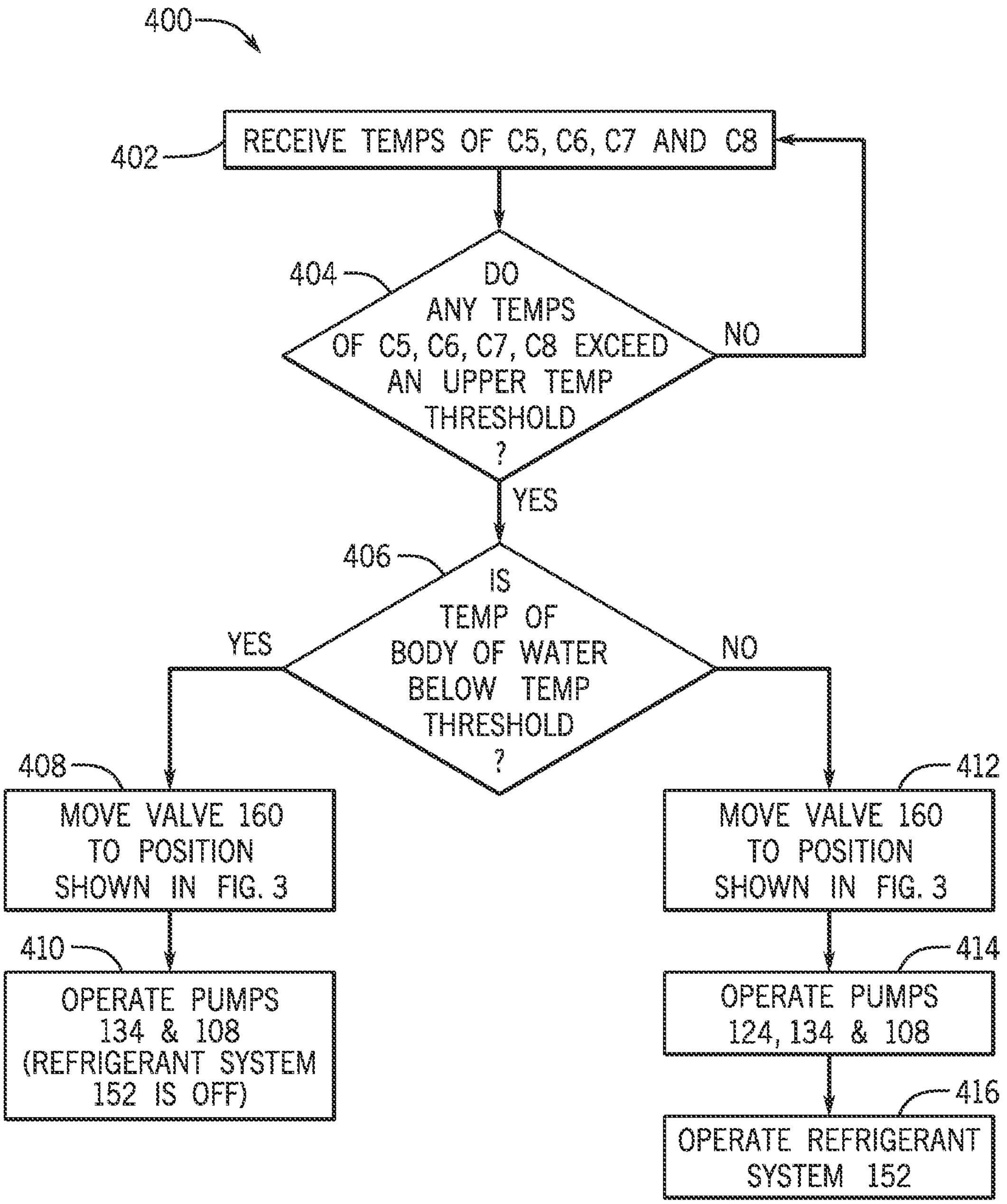
FIG. 8 is a flow chart depicting another method according to the present disclosure for controlling a thermal management system such as shown in FIG. 2.
Figure 9:
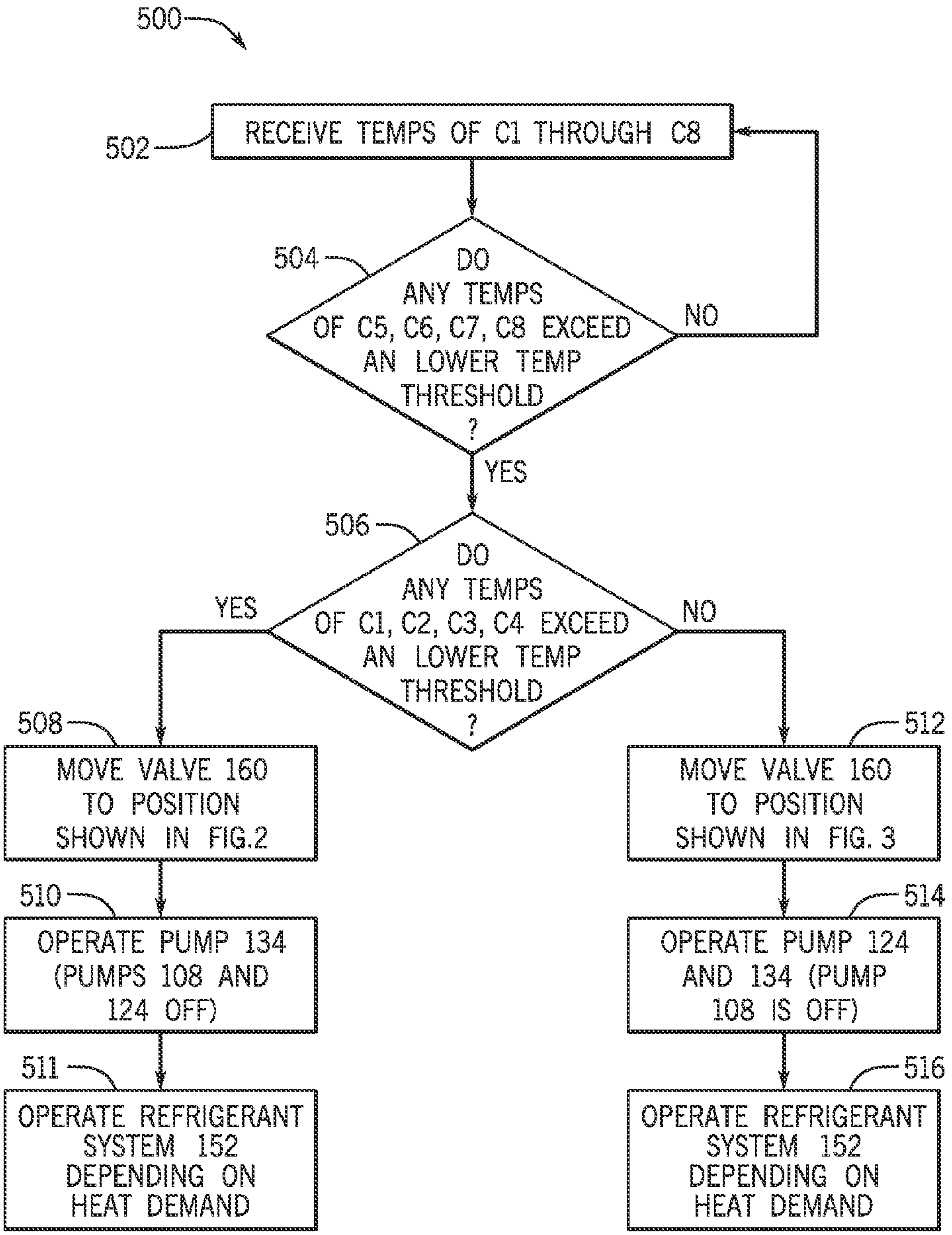
FIG. 9 is a flow chart depicting one method according to the present disclosure for controlling a thermal management system such as shown in FIG. 2.

FIGS. 7-9 depict methods according to the present disclosure for controlling a thermal management system such as the system 10 of FIG. 2. The method 300 of FIG. 7 may be used to determine whether additional cooling is needed for components C1, C2, C3, and/or C4, and how to control the thermal control system 10 accordingly. With reference to the thermal management system 10 of FIG. 2, step 302 of the method 300 of FIG. 7 provides for receiving the temperatures of components C1, C2, C3 and C4 in a manner described above. Step 304 compares the temperatures from step 302 to upper temperature thresholds. If any of the temperatures of components C1, C2, C3 and C4 exceed the corresponding upper temperature thresholds in step 304, the process continues to step 306. Step 306 provides for determining whether the temperature of the body of water is below a corresponding temperature threshold. If step 306 is determined in the affirmative, the valve 160 is moved in step 308 to the position shown in FIG. 2. The pump 124 and the pump 108 are operated in step 310. If instead step 306 is determined in the negative, the valve 160 is moved in step 312 to the position shown in FIG. 3. The pumps 124, 134, and 108 are operated in step 314 and the refrigerant system 152 is operated in step 316 (i.e., recognizing that the temperature of the body of water alone will be insufficient to provide the necessary cooling, as discussed above).

The method 400 of FIG. 8 may be used to determine whether additional cooling is needed for components C5, C6, C7, and/or C8, and how to control the thermal control system 10 accordingly. With continued reference to the thermal management system 10 of FIG. 2, step 402 of the method 400 of FIG. 8 provides for receiving the temperatures of components C5, C6, C7 and C8 in a manner described above. Step 404 compares the temperatures from step 402 to upper temperature thresholds. If any of the temperatures of components C5, C6, C7 and C8 exceed the corresponding upper temperature thresholds in step 404, the process continues to step 406. Step 406 provides for determining whether the temperature of the body of water is below a corresponding temperature threshold. If step 406 is determined in the affirmative, the valve 160 is moved in step 408 to the position shown in FIG. 3. The pump 134 and the pump 108 are operated in step 410. The refrigerant system 152 is not operated as the body of water is cool enough to provide sufficient cooling for components C5, C6, C7, and C8. If instead step 406 is determined in the negative, the valve 160 is moved in step 412 to the position shown in FIG. 3 and the pumps 124, 134, and 108 are operated in step 414. The refrigerant system 152 is also operated in step 416 since the temperature of the body of water alone is insufficient to provide the necessary cooling.

The method 500 of FIG. 9 may be used to determine whether additional cooling is needed for components C1, C2, C3, and C4, how this compares to the temperatures of components C5, C6, C7, and/or C8, and how to control the thermal control system 10 accordingly. With continued reference to the thermal management system 10 of FIG. 2, step 502 of the method 500 of FIG. 9 provides for receiving the temperatures of components C1 through C8 in a manner described above. Step 504 compares the temperatures of components C5, C6, C7, and C8 to lower temperature thresholds. If the temperatures of components C5, C6, C7 and C8 are below the corresponding lower temperature thresholds in step 504, the process continues to step 506. Step 506 provides for determining whether the temperature of the temperatures of components C1, C2, C3, and/or C4 exceed corresponding lower temperature thresholds. If step 506 is determined in the affirmative, the valve 160 is moved in step 508 to the position shown in FIG. 2. The pump 134 is operated, with pumps 108 and 124 being off. The refrigerant system 512 is also operated in step 511 is necessary, depending on demands. If instead step 506 is determined in the negative, the valve 160 is moved in step 512 to the position shown in FIG. 3 and the pumps 124, 134 are operated in step 514 (without operating pump 108). The refrigerant system 512 is also operated in step 516 is necessary, depending on demands.

In this manner, the present inventors have recognized unmet needs for thermally managing these components. Any house loads that consume power for cooling or heating result in inefficiency and, particularly for vehicles that also use electric power for propulsion, reduced operating range. Therefore, to extend the operating range of these vehicles, it is important to improve efficiency of heat transfer and reuse heat where possible. Heat pumps are commonly employed to provide cooling and heating. Refrigeration systems are often required to provide battery cooling. The present inventors have recognized that the heating and cooling needs of power systems (e.g., batteries), propulsion devices, and house loads (e.g., HVAC) can be combined together for a more efficient thermal management system for vehicles.

As discussed above, the thermal management systems 10 disclosed herein provide many advantages over systems presently known in the art. Sharing the heating and cooling across the components in the manner presently disclosed allows heating and cooling to be accomplished using fewer valves and heat exchangers than systems presently known in the art. This provides reduced installation cost, space, operating cost, and maintenance. Additionally, within the unique context of marine vessels, the present inventors have recognized that the body of water in which the marine vessel is operated can be used both for rejecting heat from the thermal management system and to extract heat for the thermal management system (e.g., selectable by reversing a direction of flow via the valve). For example, the body of water may be used as a heat source for cabin heating. In short, the presently disclosed thermal management system 10 improves energy efficiency of heating and cooling for both propulsion and non-propulsion components while also reducing the number of devices to do so.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A thermal management system for a marine vessel, the thermal management system comprising:

an open loop circuit;

a pump that pumps water from a body of water in which the marine vessel is operating, through the open loop circuit, and back to the body of water;

a first closed loop circuit;

a pump that pumps a first heat transfer fluid through the first closed loop circuit;

a first component cooled or heated by the first heat transfer fluid;

a first heat exchanger configured to provide heat exchange between the water and the first heat transfer fluid;

a second closed loop circuit;

a pump that pumps a second heat transfer fluid through the second closed loop circuit;

a second component cooled or heated by the second heat transfer fluid;

a second heat exchanger fluidly coupled within the second closed loop circuit so as to provide heat exchange for the second heat transfer fluid;

a valve having first and second valve positions that vary flows of the first heat transfer fluid and the second heat transfer fluid therethrough; and a control system configured to change between the valve positions of the valve, wherein in the first position the first heat transfer fluid and the water exchange heat with each other via the first heat exchanger without the second heat transfer fluid exchanging heat with the water, the first component exchanging heat via the first heat exchanger without exchanging heat via the second heat exchanger, and the second component exchanging heat via the second heat exchanger without exchanging heat via the first heat exchanger, and in the second position the water exchanges heat with both the first heat transfer fluid and the second heat transfer fluid via the heat exchanger, the first component and the second component each exchanging heat via both the first heat exchanger and the second heat exchanger.

2. The thermal management system according to claim 1, wherein when the valve is in the first position the first closed loop and the second closed loop are fluidly isolated from each other.

3. The thermal management system according to claim 2, wherein when the valve is in the second position the first closed loop circuit and the second closed loop circuit are fluidly connected in series such than the first heat transfer fluid and the second heat transfer fluid each flow through both the first component and the second component without bypassing either the first heat exchanger or the second heat exchanger.

4. The thermal management system according to claim 1, further comprising a refrigeration system that cools a refrigerant within a closed loop refrigerant circuit, wherein the second heat exchanger provides heat exchange between the second heat transfer fluid and the refrigerant.

5. The thermal management system according to claim 4, wherein when the valve is in the first position the first closed loop and the second closed loop are fluidly isolated from each other and the second heat transfer fluid is cooler than the first heat transfer fluid.

6. The thermal management system according to claim 5, wherein the first component is part of a powertrain for generating torque for the marine vessel and the second component is a battery.

7. The thermal management system according to claim 5, further comprising a temperature sensor that measures a temperature of the first heat transfer fluid, wherein the control system is configured to position the valve in the second position of the valve positions to fluidly connect the first closed loop circuit and the second closed loop circuit when the temperature measured by the temperature sensor is below a threshold temperature.

8. The thermal management system according to claim 4, wherein when the valve is in the second position the valve fluidly connects the first closed loop circuit and the second closed loop circuit in series such that the first heat transfer fluid and the second heat transfer fluid are each conveyed from the first heat exchanger to the second closed loop circuit, through the first closed loop circuit, and back to the first heat exchanger.

9. A thermal management system for a marine vessel, the thermal management system comprising:
- an open loop circuit;
- a pump that pumps water from a body of water in which the marine vessel is operating, through the open loop circuit, and back to the body of water;
- a first closed loop circuit;
- a pump that pumps a first heat transfer fluid through the first closed loop circuit;
- a first component cooled or heated by the first heat transfer fluid;
- a second closed loop circuit;
- a pump that pumps a second heat transfer fluid through the second closed loop circuit;
- a second component cooled or heated by the second heat transfer fluid;
- a first heat exchanger configured to exchange heat between the water and the first heat transfer fluid;
- a second heat exchanger fluidly coupled within the second closed loop circuit so as to provide heat exchange for the second heat transfer fluid;
- a valve having valve positions for selecting whether the heat is exchanged between the second heat transfer fluid and the water, and between the second heat transfer fluid and the first heat transfer fluid, for cooling or heating the first component; and
- a control system configured to change the valve positions of the valve, wherein the first heat transfer fluid flows through the first heat exchanger without flowing through the second heat exchanger and the second heat transfer fluid flows through the second heat exchanger without flowing through the first heat exchanger when the valve is in a first valve position of the valve positions, and wherein both the first heat transfer fluid and the second heat transfer fluid each flow through both the first heat exchanger and the second heat exchanger when the valve is in a second valve position of the valve positions.

10. The thermal management system according to claim 9, wherein the water, the first heat transfer fluid, and the second heat transfer fluid remain fluidly isolated from each other in all of the valve positions.

11. The thermal management system according to claim 10, wherein the first heat transfer fluid is chemically different than the second heat transfer fluid.

12. The thermal management system according to claim 9, further comprising a refrigeration system that cools a refrigerant within a closed loop refrigerant circuit, wherein the second heat exchanger provides heat exchange between the second heat transfer fluid and the refrigerant.

13. The thermal management system according to claim 12, wherein when the valve is in the first valve position the valve fluidly isolates the first closed loop circuit and the second closed loop circuit, further comprising a temperature sensor that measures a temperature of the first heat transfer fluid, and wherein the control system is configured to position the valve in the second position to convey the second heat transfer fluid to the first heat exchanger when the temperature measured by the temperature sensor is below a threshold temperature.

* * * * *